United States Patent [19]

Hamatani

[11] 4,087,644
[45] May 2, 1978

[54] DIAL IMPULSE RELAY CIRCUIT

[75] Inventor: Fumikazu Hamatani, Kawasaki, Japan

[73] Assignees: Nippon Tsu Shin Kogyo K.K., Kawasaki, Japan; TIE/Communications, Inc., Stamford, Conn.

[21] Appl. No.: 725,283

[22] Filed: Sep. 21, 1976

[30] Foreign Application Priority Data

Feb. 2, 1976   Japan ................................. 51-10172

[51] Int. Cl.² ............................................. H04M 3/22
[52] U.S. Cl. ................................. 179/16 E; 361/210
[58] Field of Search .................... 317/141 S, 155.5; 361/196, 210; 328/131, 168; 178/69 A, 70 R; 179/16 A, 16 AA, 16 E, 16 EA, 18 F, 18 FA, 18 GD

[56] References Cited

U.S. PATENT DOCUMENTS

| | | | |
|---|---|---|---|
| 2,224,701 | 12/1940 | Saville et al. | 179/16 E |
| 3,529,098 | 9/1970 | Chapman | 179/18 F |
| 3,551,754 | 12/1970 | Shaffer | 179/18 FA |
| 3,665,109 | 5/1972 | Shaffer | 179/16 E |
| 3,676,601 | 7/1972 | Shaffer | 179/16 E |
| 3,715,511 | 2/1973 | Shaffer | 179/16 E |
| 3,842,323 | 10/1974 | Harris et al. | 317/141 S |

FOREIGN PATENT DOCUMENTS 1,084,382   4/1965   United Kingdom ............... 179/16 E Primary Examiner—Kathleen H. Claffy
Assistant Examiner—Randall P. Myers
Attorney, Agent, or Firm—Kenyon & Kenyon

[57] ABSTRACT

The disclosure relates to a dial impulse relay circuit including a three-winding relay which repeats a pulse train generated by a first circuit onto a second circuit with substantially no pulse ratio distortion.

2 Claims, 6 Drawing Figures

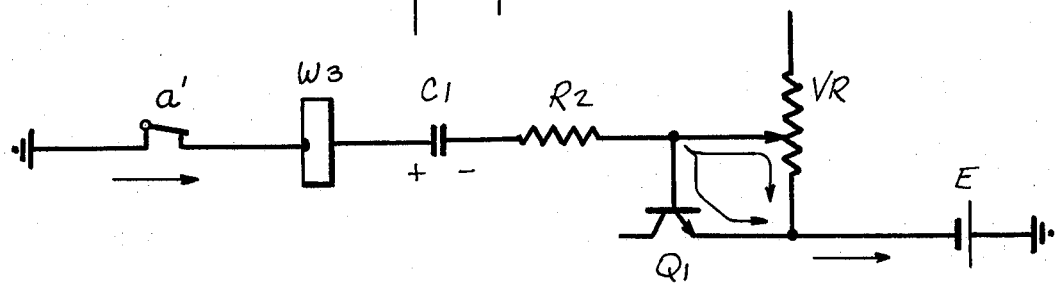
Fig.3-A.
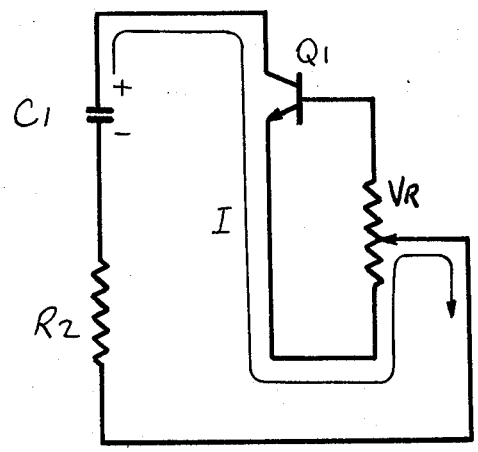
Fig.3-B.
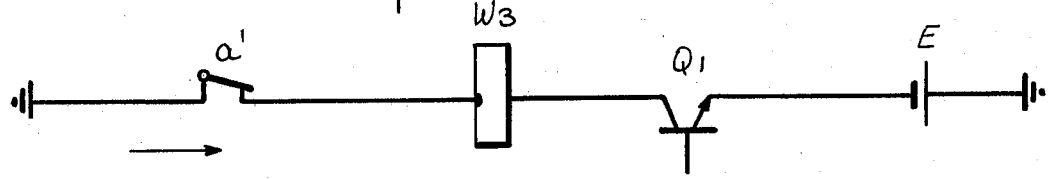
Fig.3-C.
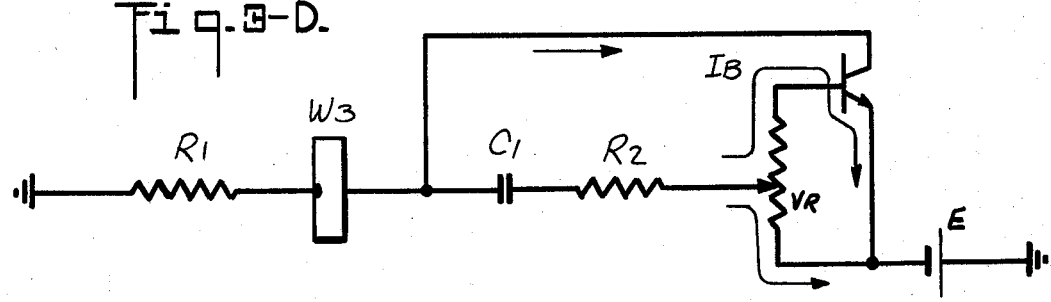
Fig.3-D.

DIAL IMPULSE RELAY CIRCUIT

BACKGROUND OF THE INVENTION

This invention relates to the field of dial impulse relay circuits which upon receiving a dial impulse generated by a first circuit, repeat that dial impulse onto a second circuit. These relay circuits find utility in repeating impulses generated in a telephone set, but may find use in a variety of equipments requiring electrical isolation between a first circuit in which an impulse is generated and a second circuit to which the impulse is to be applied.

Prior relay circuits in the telephone apparatus arts have generally used a single two-winding relay as a repeating relay. These circuits have had the disadvantage of introducing relay response time distortions caused by differences between the relay operate time and the release time when the relay is used to supply current to a talking path or when used to repeat dial impulses on a talking path.

An object of the invention described herein is to provide a dial impulse relay circuit which substantially eliminates these relay response time distortions.

SUMMARY OF THE INVENTION

The invention relates to a dial impulse relay circuit in which a relay is energized by current flow in a first circuit thereby closing a make contact connected in a second circuit and in which dial impulses generated in the first circuit are repeated in the second circuit by the opening and closing of the make contact. The invention comprises a circuit in which the relay has a first and second winding connected to the first circuit, and, in addition a third winding which is connected to a direct current voltage source. The d.c. source supplies current to the third winding which generates a magnetic flux in the relay winding core in the same direction as the magnetic flux generated in the first and second windings when current is flowing in the first circuit through the first and second windings. Between the d.c. source and the third winding, a switching circuit is connected which turns on when current from the first circuit flows to the first and second windings, which turns off when the current in the first circuit stops flowing in the first and second windings, and which is constructed such that the time after the current from the first circuit stops flowing until the relay is de-energized is variable.

Because of the variability feature, the time interval between the time at which the current from the first circuit stops flowing until the time the switching circuit turns off can be adjusted as desired. Thus it is possible to adjust the interval after the current from the first circuit stops flowing until the relay resets. Consequently the release response time can be made equal to the operate response time, thereby cancelling relay response time distortion in the repetition of dial impulses.

BRIEF DESCRIPTION OF THE DRAWINGS

The invention will be better understood by referring to the attached drawings in which.

DESCRIPTION OF THE INVENTION

Figure 1:
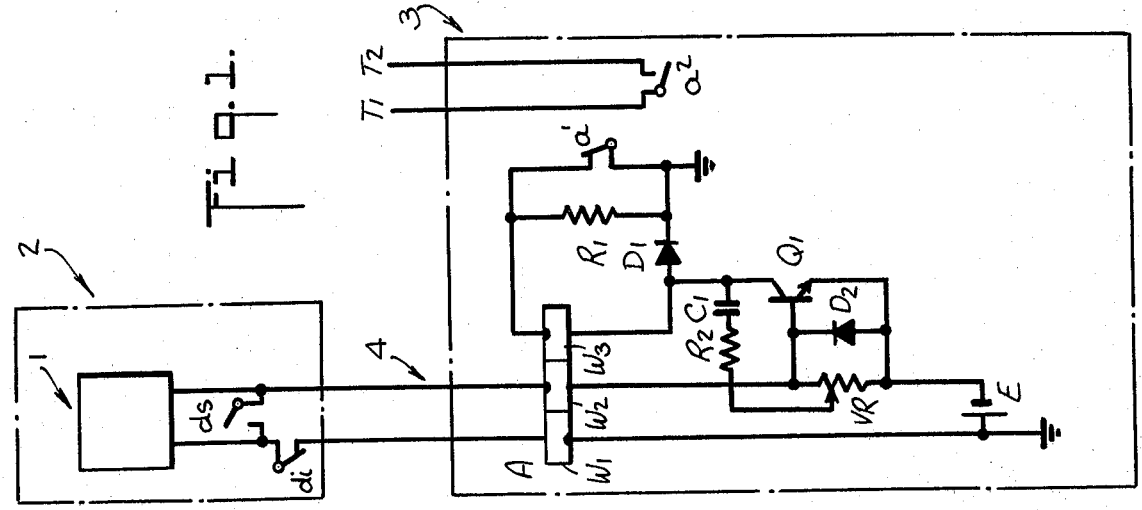
FIG. 1 shows a schematic circuit of the invention.

FIG. 1 shows a schematic circuit diagram of the invention in which the box labeled 1 is a telephone set network, the box labeled 2 is a telephone station set, the box labeled 3 represents a dial relay circuit which also serves as a talking current supply circuit, and lines 4 are talking conductors which connect the telephone set 2 with the talking supply circuit 3. Relay A has three windings W1, W2 and W3. Dial impulse relay circuit 3 has two of the relay A windings W1 and W2 connected to lines 4, the connection shown providing mutually additive flux directions as the current flows through lines 4 and d.c. power source E.

When dialing is to be performed, the lifting of the handset at telephone set 2 causes a hookswitch contact (not shown) to close, current flows in relay A windings W1 and W2, contact $a^1$ opens and contact $a^2$ closes. Dialing of the telephone set 2 causes contact di to interrupt, or open and close one or more times, causing the current in relay A windings W1 and W2 to stop and then to resume flowing one or more times. In response to the interruption of current flow in the windings of relay A, make contact $a^2$ of relay A opens and closes thereby repeating the dial impulses on lines T1 and T2.

As shown in FIG. 1, relay A is further provided, according to this invention, with a third winding W3 and another contact, break contact $a^1$. This third winding W3 is connected to transistor Q1 and power source E in a manner such that when Q1 conducts, current flows from ground, through $a^1$, through the winding W3 and thence through the transistor Q1, returning to d.c. source E. The direction of the current flow in winding W3 is established so that the direction of its magnetic flux will be the same as the magnetic flux produced in windings W1 and W2 when talking line current flows in them.

The third winding W3 is connected to the collector of NPN transistor Q1 to provide a path to ground via resistor R1, the negative terminal of d.c. source E being connected to the emitter. The positive terminal of source E is connected to ground. The variable resistor VR is connected in series between source E and winding W2 of relay A. Part of the current flowing between source E and winding W2 is shunted through the base-emitter junction of transistor Q1. The wiper terminal of variable resistor VR is connected to the collector of transistor Q1 via a resistor R2 and a capacitor C1. Break contact $a^1$ of relay A, normally closed as shown in FIG. 1 when relay is not operated, shunts resistor R1 to provide a maximum current flow through winding W3 in order to achieve rapid operation of relay A. Resistor R1 provides a lower holding current through winding W3 under control of transistor Q1 so as to achieve control over the release of relay A by the turn-off of Q1. Diode D1 is poled in the direction shown in FIG. 1 to protect Q1 against surge voltages occurring in winding W3. Diode D2 serves to protect against high reverse voltages which would break down the emitter-base junction of transistor Q1.

Figure 2:
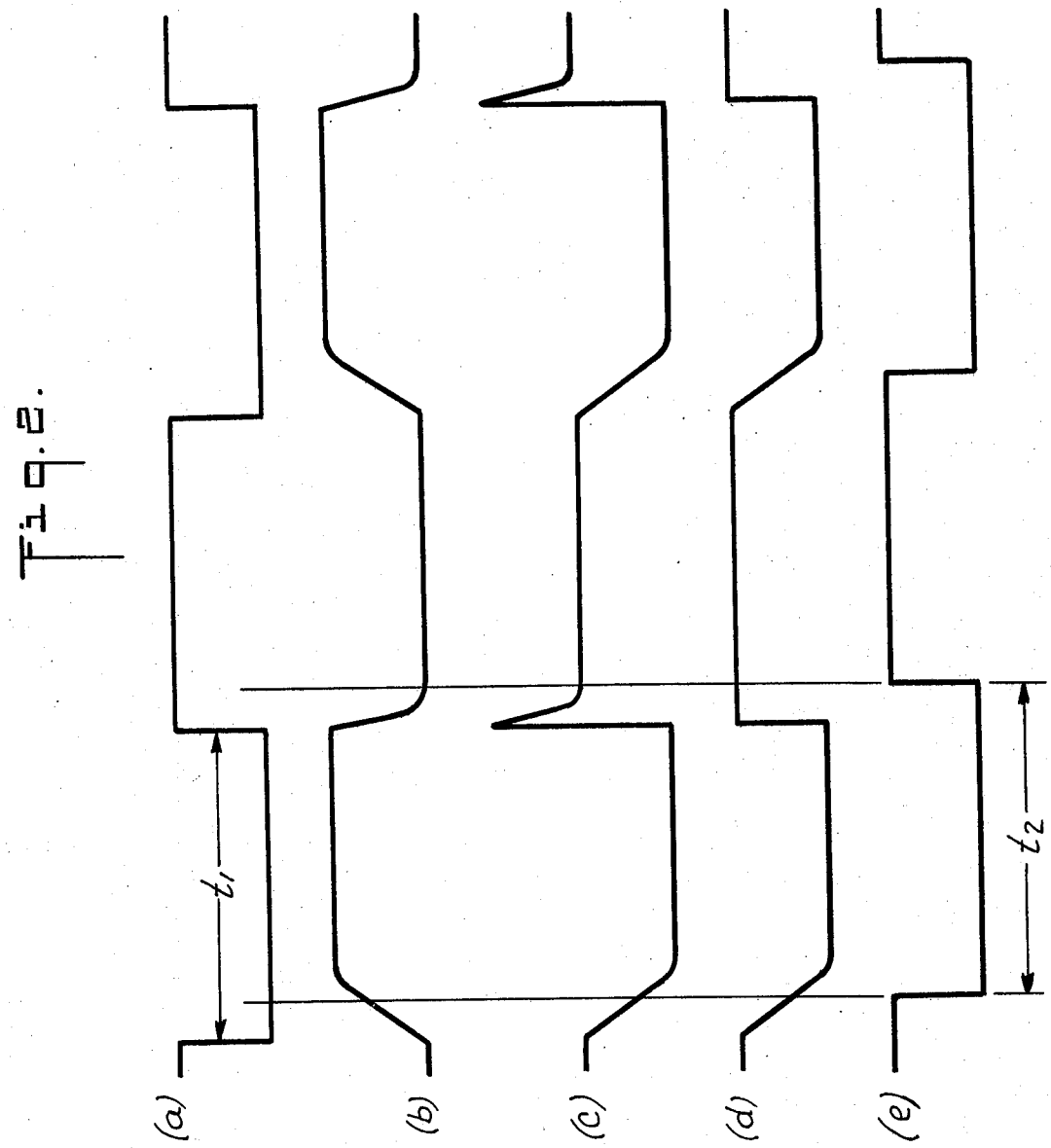
FIG. 2 is a diagram showing the operating waveforms at selected points of the circuit of FIG. 1, and FIGS. 3A – 3D show portions of the circuit of FIG. 1 which are used in explaining the operation of the invention.

Referring now to FIG. 2, which shows waveforms of currents and voltages at different points of the circuit of FIG. 1, the operation of the circuit will be explained. First, when the telephone set 2 is in an idle state and there is no current flowing in lines 4, capacitor C1 is charged through the closed circuit as shown in FIG. 3-A.

When the handset of telephone set 2 is lifted, talking network 1 and lines 4 are connected. Current then flows from source E, operating relay A. A sufficient voltage drop occurs across variable resistor VR so that transistor Q1 is turned on. Capacitor C1 discharges through the circuit as shown in FIG. 3-B.

Since transistor Q1 is now conducting, current flows in winding W3 through the closed circuit shown in FIG. 3-C.

Because of the additional flux of third winding W3, the core of relay A saturates more quickly, the opening of break contact $a^1$ and closing of make contact $a^2$ occur sooner after hookswitch contact HS closes than would be the case were only two windings W1 and W2 used.

Next, when dialing begins at telephone set 2, contact ds closes first, contact di opens or "interrupts" one or more times, sending a current pulse train through lines 4, as shown in FIG. 2, which illustrates the sending of two pulses. When the contact di is open, no current flows in lines 4 nor in the windings W1 and W2 of relay A. Prior to the point at which current stopped flowing in lines 4, relay A was already operated, and of course, break contact $a^1$ was open, and make contact $a^2$ closed. Thus, immediately after current in windings W1 and W2 stops flowing, Q1 base current from winding W2 is cut off and Q1 begins to turn off. But as Q1 begins to turn off and the voltage at its collector rises, C1 begins to recharge through the base of Q1, providing an alternate path to keep Q1 on so that current continues to flow in winding W3 according to the circuit of FIG. 3-D as long as Q1 is not fully charged.

Thus, current continues to flow through the collector-emitter path of Q1 and winding W3 during the charging time of capacitor C1 and relay A remains operated even after the current flowing in windings W1 and W2 stops until capacitor C1 is charged, at which time transistor Q1 is turned off and current no longer flows in winding W3. As a result, the release of the relay contacts (the opening of make contact $a^2$ and the closing of break contact $a^1$) is delayed after the instant when the current in lines 4 is interrupted for a period equal to the charging time of capacitor C1.

This relationship is shown in the waveforms of FIG. 2. Waveform (a) represents the current flowing in lines 4 and windings W1 and W2. When contact di opens, the current goes to zero; when contact di closes, the current flows again. Waveform (b) represents the voltage waveform on capacitor C1. Waveform (c) represents the collector current of transistor Q1. Waveform (d) represents the current flowing in winding W3 of relay A. Waveform (e) represents the make and break states of make contact $a^2$.

When contact di closes, current in response to source E flows via contacts di and ds through lines 4. Current flows through VR and the base-emitter junction of Q1, turns Q1 on; hence current flows in winding W3 according to the FIG. 3-C indicated above. Thus, the opening of break contact $a^1$ and the closing of make contact $a^2$ are speeded up. The discharge of capacitor C1 at this time is according to the FIG. 3-B as indicated above. As a result, the collector current of Q1 rises to a peak temporarily after contact di closes, as shown in FIG. 2(c).

The sequences described above are repeated for each opening and closing of dial impulse contact di.

Because the charging current of capacitor C1 can be divided between the base circuit of Q1 and an alternate path to E through resistor VR by adjusting the point at which the wiper arm of variable resistor VR is set, the point at which Q1 turns off during the charging period of C1 can be adjusted. By this means the invention provides a means to vary the release delay time of contacts $a^1$ and $a^2$ of relay A. In other words it is a feature of this invention to be able to adjust the time between the current flow in windings W1 and W2 ceasing and the time at which contacts $a^1$ and $a^2$ are released by adjusting variable resistor VR. As a result, it is possible to adjust the variable resistor VR to make the release time of contacts $a^1$ and $a^2$ of relay A substantially equal to their operate time (the time after current flow to windings W1 and W2 of relay A starts and before contacts $a^1$ and $a^2$ operate).

When this is done, the dial impluses applied to lines T1 and T2 by the operation of make contact $a^2$ will be delayed with respect to the dial impulse sent from telephone set 2, but will not have ratio distortion. That is, the pulse widths of the pulses repeated onto lines T1 and T2 are substantially equal to the pulse widths caused by the opening and closing of contact di. The invention repeats pulses without pulse ratio distortion.

Although winding W3 of relay A is connected interposed to the collector circuit of transistor Q1 in the example described above, it should be apparent that it may also be interposed at the emitter side of transistor Q1.

Although the present invention has been explained above in terms of a specific preferred embodiment, the invention is not to be limited thereby, the claims which follow providing the scope of the invention. It should be apparent that various designs and modifications are possible within the scope of the invention.

What is claimed is:

1. A dial impulse repeating circuit comprising
   a relay that is connected to a pulse generating circuit, said relay having a make contact which closes when current flows in said pulse generating circuit and which repeats dial impulses applied to said pulse generating circuit to a second circuit connected to said make contact, said relay having a first and second winding connected in series with said pulse generating circuit such that their respective magnetic fluxes are additive, and having a third winding,
   direct-current power source means for applying current to said third winding for generating magnetic flux in a direction the same as the magnetic flux generated in said first and second windings when said current is supplied from said pulse generating circuit to said first and second windings, and
   a switching circuit interposed between said direct current power source means and said third winding, said switching circuit cutting off current flow through said third winding in response to the cessation of current flow in said pulse generating circuit, said switching circuit allowing current to flow through said third winding in response to the beginning of current flow in said pulse generating circuit, said switching circuit having means for adjusting the time interval between the cessation of current flow in said pulse generating circuit and the cessation of current flow through said third winding.

2. The dial impulse relay circuit of claim 1 wherein the switching circuit comprises,
   a transistor to which is connected between its emitter and collector a first series circuit comprising said third winding of said relay, said direct current power source and a first resistor;

a variable resistor the two end terminals of which are connected in series with said first and second windings, said ends of said variable resistor also being connected across the base and emitter of said transistor;

a second series circuit of a second resistor and a capacitor connected between the sliding terminal of said variable resistor and the collector of the said transistor; and a break contact that is connected in parallel with said first resistor and is actuated by said relay, wherein the time after the current from said first circuit stops until the current flow in said third winding is turned off, is adjustable by varying the position of said sliding terminal on said variable resistor.

* * * * *